US008622846B2

(12) United States Patent
Ahn

(10) Patent No.: US 8,622,846 B2
(45) Date of Patent: Jan. 7, 2014

(54) GOLF TRAINING GLASSES AND METHOD OF USE THEREOF

(76) Inventor: Kyong Ho Ahn, Suwanee, GA (US)

( * ) Notice: Subject to any disclaimer, the term of this patent is extended or adjusted under 35 U.S.C. 154(b) by 0 days.

(21) Appl. No.: 13/323,865

(22) Filed: Dec. 13, 2011

(65) Prior Publication Data

US 2013/0150173 A1   Jun. 13, 2013

(51) Int. Cl.
    *A63B 69/36*        (2006.01)
(52) U.S. Cl.
    USPC ............................... 473/210; 473/409; 351/45
(58) Field of Classification Search
    USPC .......... 473/207.208, 210, 211, 266, 268, 274,
              473/409; 351/141, 157, 158, 41, 45, 46, 57
    See application file for complete search history.

(56) References Cited

U.S. PATENT DOCUMENTS

| 3,555,563 | A | * | 1/1971 | Grossman | ..................... | 2/433 |
| 4,022,475 | A | | 5/1977 | Todd | | |
| 4,168,111 | A | | 9/1979 | Baines | | |
| 4,531,743 | A | * | 7/1985 | Lott | ............................. | 473/210 |
| 4,852,882 | A | * | 8/1989 | Otsuka et al. | ................. | 473/210 |
| 4,865,438 | A | * | 9/1989 | Wada | ............................. | 351/158 |
| 4,929,075 | A | * | 5/1990 | Eliakim | ........................ | 351/158 |
| 4,969,649 | A | * | 11/1990 | Lugiewicz | .................... | 473/210 |
| 5,177,510 | A | | 1/1993 | Peters et al. | | |
| 5,428,474 | A | | 6/1995 | Murphy | | |
| 5,488,438 | A | | 1/1996 | Cochran | | |
| 5,538,250 | A | | 7/1996 | Putz | | |
| 5,661,534 | A | * | 8/1997 | Gill | ................................ | 351/41 |
| 5,682,220 | A | | 10/1997 | Sherman et al. | | |
| 5,784,195 | A | | 7/1998 | MacCollum | | |
| 6,390,823 | B1 | | 5/2002 | Wesenhagen | | |
| 6,513,928 | B1 | | 2/2003 | Moore | | |
| 6,558,266 | B2 | | 5/2003 | McMahon | | |
| 6,942,336 | B2 | | 9/2005 | Foulke et al. | | |
| 7,048,371 | B1 | | 5/2006 | Moore | | |
| 7,328,997 | B2 | | 2/2008 | Russomagno et al. | | |

\* cited by examiner

*Primary Examiner* — Nini Legesse
(74) *Attorney, Agent, or Firm* — Matthew L. Grell; Balser & Grell IP Law

(57) ABSTRACT

A pair of golf training glasses having protruding apertures extending forward from the plane of the normal lens portion of the glasses which are opaque. The protruding apertures are angled on their sides to allow some directed movement of the eyeball to observe other than directly forward when necessary, while at the same time restricting peripheral vision along a line parallel to the line formed between the golfer's head and the ball that is the object of the golf swing.

17 Claims, 2 Drawing Sheets

GOLF TRAINING GLASSES AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to golf training aids, and more specifically to a pair of glasses utilized to maintain vision on a golf ball during a swing of a golf club.

2. Description of Related Art

One of the most difficult tasks during play of the game of golf is that of keeping one's head still to maintain eye contact with the ball that is the object of a golf swing. If the player of a golf stroke does not keep his/her eyes on the ball, typically the ball will be driven on an erroneous, inaccurate, course other than that desired by the golfer.

When making a golf stroke, a golfer may often believe that he/she is keeping his/her eyes on the ball, when, in fact, only peripheral vision is being utilized to observe the ball, which means that the golfer's head is actually turned. Accordingly, it is desirable to prevent the use of peripheral vision as much as possible, keeping the golfer's eyes directly upon the ball.

One previous approach to resolving the above-referenced problem was to provide rectangular slit openings in the normal plane of a pair of opaque eyeglasses. However, due to the proximity of the eyeball to the lens, quite a bit of peripheral vision is permitted by this previous device.

Various other devices have also tried to address the problem of keeping a golfer's eyes upon the ball by providing different shapes of slits in either an opaque lens, by providing blocking panels of various shapes on the lens, or by providing registration lines on the lens. Again, the close proximity to the golfer's eyeball permits a large amount of peripheral vision to be utilized, thereby defeating the ability to control the golfer's head movement.

Other devices provide an aperture positioned well forward of the eyeball of a golfer, but does not obscure side vision, thereby permitting distraction of the golfer since his/her peripheral vision is not restricted.

Therefore, it is readily apparent that there is a need for a pair of golf training glasses that prevent the use of peripheral vision, thereby preventing distraction of the golfer and helping the golfer to maintain his/her head aligned with the ball and his/her eyes upon the ball.

BRIEF SUMMARY OF THE INVENTION

Briefly described, in a preferred embodiment, the present invention overcomes the above-mentioned disadvantages and meets the recognized need for such a device by providing a pair of golf training glasses having protruding apertures extending forward from the plane of the normal lens portion of the glasses which are opaque. The protruding apertures are angled on their sides to allow some directed movement of the eyeball to observe other than directly forward when necessary, while at the same time restricting peripheral vision along a line parallel to the line formed between the golfer's head and the ball that is the object of the golf swing.

According to its major aspects and broadly stated, the present invention in its preferred form is a pair of golf training glasses comprising a front having left and right extensions extending generally perpendicular to the front and forwardly disposed from the front, and arms that extend rearward to support the golf training glasses on a golfer's head. The left and right extensions respectively comprise left outside and right outside panels that are disposed at an angle of approximately ninety degrees to the front and the left and right extensions also respectively comprise left inside and right inside panels disposed at an angle of approximately one hundred and twenty degrees to the front. The left and right extensions each further comprise top panels and bottom panels. The inside panels, outside panels top panels and bottom panels form a visual aperture in the extensions.

The front may be slightly curved, wherein the left and right extensions extend generally perpendicular to a line tangential to the front.

A golfer's eyes are maintained focused on a golf ball by disposing a pair of the golf training glasses on the golfer's head. The golfer addresses the golf ball with a golf clubhead. The golfer's eyesight is restricted and constrained along sight lines by the left outside and right outside panels while the golfer performs a golf swing by impacting the golf ball with the golf clubhead. By these means, peripheral vision is prevented beyond a defined sight area, thereby avoiding distractions and facilitating maintenance of the golfer's eyes upon the ball.

More specifically, the present invention is a pair of golf training glasses having a front, a left extension, a right extension, arms, a nosepiece, an upper portion and a base portion. The left extension comprises a left aperture and the right extension comprises a right aperture. The right and left apertures comprise top panels and bottom panels.

The left extension comprises a left inside panel and a left outside panel and the right extension comprises a right inside panel and a right outside panel. The left inside panel forms an angle of approximately one hundred and twenty degrees to the front and the left outside panel forms an angle of approximately ninety degrees to the front. The right inside panel forms an angle of approximately one hundred and twenty degrees to the front and the right outside panel forms an angle of approximately ninety degrees to the front.

In use, a golfer places the golf training glasses on his/her head, thereby restricting the golfer's sight along generally parallel sight lines that define a sight area that includes a golf ball suitably teed up, or placed on a ground surface, and the clubhead portion of a selected golf club disposed behind the golf ball as the golfer addresses the ball. As the golfer withdraws the clubhead in performing a golf swing, the golfer keeps his/her head positioned so that the ball remains within the sight area, thereby minimizing any movement of his/her head. Additionally, the left outside panel and the right outside panel prevent the golfer from distraction to peripheral vision of any objects or any movements outside of the sight lines, which is particularly important during the golf swing. The golfer's vision is further focused directly on the ball via the left inside panel or the right inside panel depending on whether the golfer is right-handed or left-handed, respectively.

The front may have a general curvature or may be planar. When the front is planar, the front is disposed generally perpendicular to the golfer's sight area. If the front is curved, the front comprises a tangential line that is disposed generally perpendicular to the golfer's sight area.

Accordingly, a feature and advantage of the present invention is its ability to assist a golfer to keep his/her eyes focused upon the golf ball while performing a golf swing.

Another feature and advantage of the present invention is its ability to prevent distractions that might impact a golfer's peripheral vision.

Still another feature and advantage of the present invention is its ability to prevent a golfer from utilizing his/her peripheral vision during a golf swing.

Yet another feature and advantage of the present invention is its ability to help a golfer keep his/her head still during a golf swing.

Still a further feature and advantage of the present invention is that it reduces common swing errors and results in more accurate golf shots.

Yet still another feature and advantage of the present invention is that it helps a golfer keep his/her head still.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred Embodiment with reference to the accompanying drawing figures, in which like reference numerals denote similar structure and refer to like elements throughout, and in which.

DETAILED DESCRIPTION OF THE PREFERRED EMBODIMENT OF THE INVENTION

Figure 1:
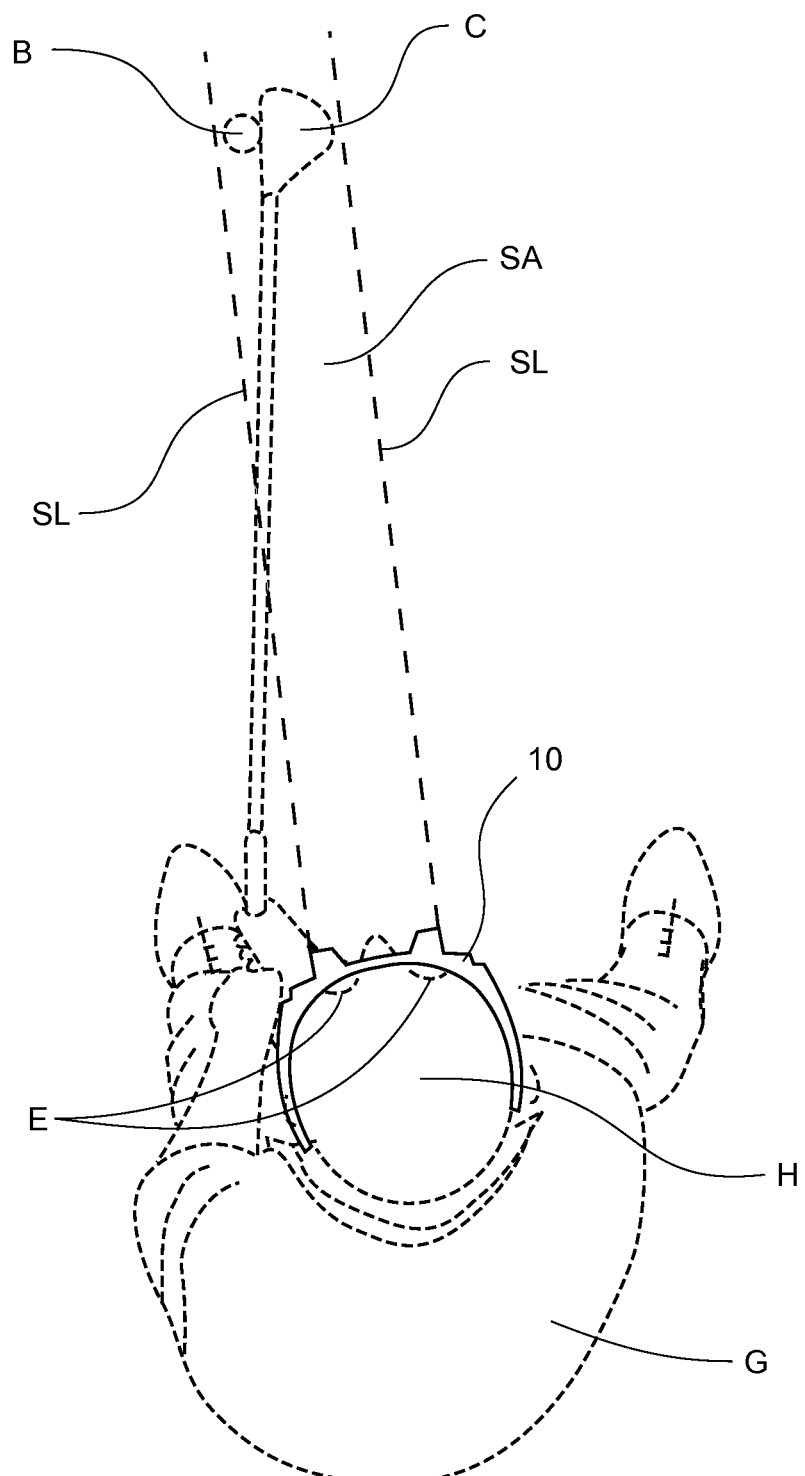
FIG. 1 is a perspective view of a golfer at the beginning of a golf swing utilizing a pair of golf training glasses according to a preferred embodiment.
Figure 2:
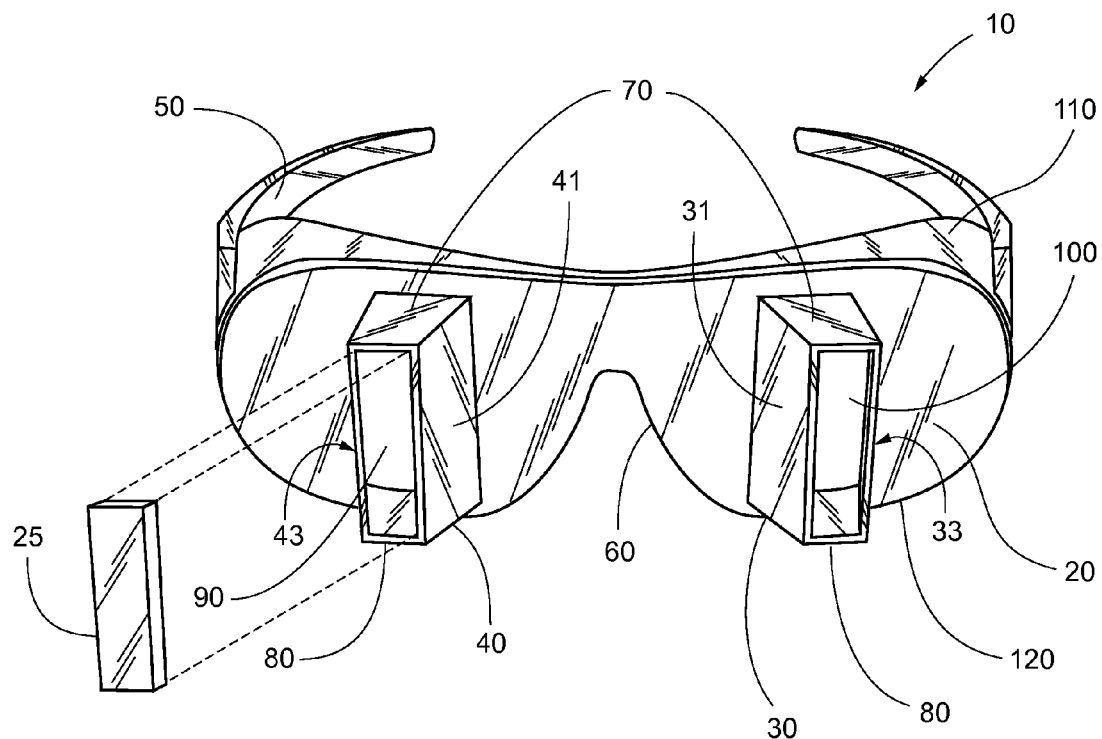
FIG. 2 is a front perspective view of a pair of golf training glasses according to a preferred embodiment.
Figure 3:
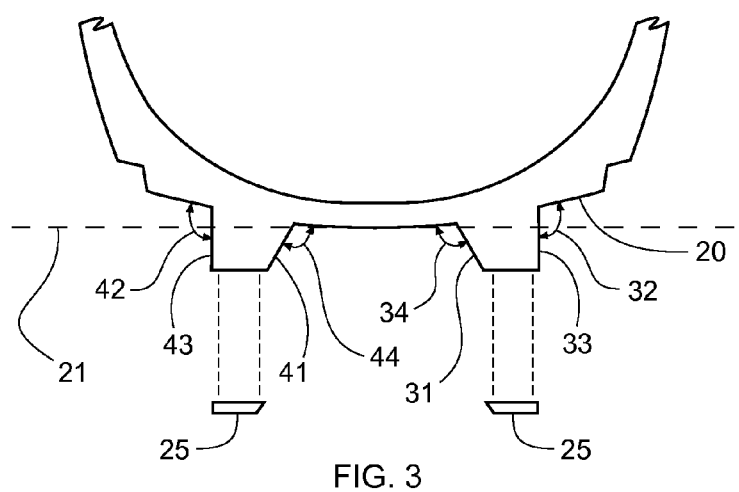
FIG. 3 is a top view of a pair of golf training glasses according to the preferred embodiment of FIG. 2.

In describing the preferred embodiment of the present invention, as illustrated in FIGS. 1-3, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-3, the present invention in a preferred embodiment is pair of golf training glasses 10, wherein golf training glasses 10 comprise front 20, left extension 30, right extension 40, arms 50, nosepiece 60, upper portion 110 and base portion 120. Left extension 30 comprises left aperture 100 and right extension 40 comprises right aperture 90. Right and left apertures 90, 100 comprise top panels 70 and bottom panels 80.

Left extension 30 further comprises left inside panel 31 and left outside panel 33 and right extension 40 further comprises right inside panel 41 and right outside panel 43. Left inside panel 31 forms angle 34 of approximately one hundred and twenty degrees to front 20 and left outside panel 33 forms angle 32 of approximately ninety degrees to front 20. Right inside panel 41 forms angle 44 of approximately one hundred and twenty degrees to front 20 and right outside panel 43 forms angle 42 of approximately ninety degrees to front 20.

Optionally, left extension 30 or right extension 40 could be covered by cap 25, wherein cap 25 comprises, for exemplary purposes only, rubber, and wherein cap 25 covers whichever of left extension 30 or right extension 40 to which it is applied, thereby blocking vision from that extension.

In use, golfer G places golf training glasses 10 on his/her head H, wherein golf training glasses 10 are disposed to provide sight lines SL, and wherein sight lines SL define sight area SA. Golfer G addresses ball G, placing clubhead C behind ball. As golfer G withdraws clubhead C in performing a golf swing, golfer G keeps head H positioned so that ball B remains within sight area SA, thereby minimizing any movement of head H. Additionally, left outside panel 33 and right outside panel 43 prevent golfer G from distraction to peripheral vision by any objects or movement outside of sight lines SL, particularly during swinging action to drive ball B with clubhead C.

Further, left inside panel 31 and/or right inside panel 41 narrow golfer G's eyesight within sight lines SL, particularly concentrating vision on the ball via the left eye of a right-handed golfer or the right eye of a left-handed golfer. Further, top panels 70 and bottom panels 80 prevent distractions from above and below golfer's vision.

When desired, cap 25 is disposed selectively on left extension 30 or right extension 40, thereby blocking vision through the selected extension. In such fashion, golfer G can focus on better control of his/her swing via concentration of vision on his/her stronger or weaker eye E.

Front 20 may have a curvature or be planar. When front 20 is planar, front 20 is disposed generally perpendicular to golfer's sight area SA. If front 20 is curved, front 20 comprises tangential line 21, wherein tangential line 21 is disposed generally perpendicular to golfer's sight area SA.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. Golf training glasses for positioning on a golfer's head, said glasses comprising:

a front having left and right extensions, each said extension formed of a plurality of panels forwardly disposed therefrom said front, wherein said left and right extensions and said front each comprise an aperture formed therethrough, and wherein said plurality of panels form a narrow vertical conduit and said aperture is configured as a narrow vertical slot;

arms, wherein said arms extend rearward from said front and support the golf training glasses on the golfer's head.

2. The golf training glasses of claim 1, wherein said plurality of panels are disposed at an angle of approximately ninety degrees to said front.

3. The golf training glasses of claim 1, wherein said plurality of panels an inside panel.

4. The golf training glasses of claim 3, wherein said inside panel is disposed at an angle of approximately one hundred and twenty degrees to said front.

5. The golf training glasses of claim 1, wherein said left and right extensions each comprise a top panel and a bottom panel.

6. The golf training glasses of claim 1, wherein said left and right extensions extend generally perpendicular to said front.

7. The golf training glasses of claim 1, wherein said front is slightly curved, and wherein said left and right extensions extend generally perpendicular to a line tangential to said front.

8. The golf training glasses of claim 1, wherein said left and right extensions each comprise a top panel, a bottom panel, an outside panel and an inside panel, and wherein said aperture of each of said left and right extensions is defined by said top panel, said bottom panel, said outside panel and said inside panel.

9. The golf training glasses of claim 8, wherein each of said inside panels is disposed at an angle of approximately one hundred and twenty degrees to said front.

10. The golf training glasses of claim 8, wherein each of said outside panels is disposed at an angle of approximately ninety degrees to said front.

11. The golf training glasses of claim 8, further comprising a cap dimensioned to secure over one of said left and right extensions, covering said aperture.

12. The golf training glasses of claim 9, wherein each of said outside panels is disposed at an angle of ninety degrees to said front.

13. A method of a golfer maintaining the golfer's eyes on a golf ball, wherein said method comprises the steps of:
disposing a pair of golf training glasses on the golfer's head, said golf training glasses having a front with left and right extensions, each said extension formed of a plurality of panels forwardly disposed therefrom said front, wherein said left and right extensions and said front each comprise an aperture formed therethrough, and wherein said plurality of panels form a narrow vertical conduit and said aperture is configured as a narrow vertical slot, and arms extending rearward from said front, wherein said arms support said golf training glasses on the golfer's head;
addressing a golf ball with a golf clubhead;
restricting the golfer's eyesight along sight lines; performing a golf swing;
impacting the golf ball with the golf clubhead; and
maintaining the golfer's eyes on the golf ball during said impacting of the clubhead with the golf ball by said restricting of the golfer's eyesight along said sight lines.

14. The method of claim 13, wherein said left and right extensions respectively comprise left outside and right inside panels, and wherein said step of restricting comprises the step of:
constraining the golfer's eyesight along sight lines via said left outside and right outside panels.

15. The method of claim 13, wherein said method comprises the step of:
preventing peripheral vision beyond a defined sight area.

16. The method of claim 13, said method further comprising the steps of:
covering a selected one of said apertures of said left and right extensions with a cap; and
blocking vision through said selected aperture of one of said left and right extensions.

17. A pair of golf training glasses comprising:
a curved front having a line tangential thereto; and
left and right extensions each having an aperture therein, wherein said aperture is defined by a top panel, a bottom panel, an inside panel and an outside panel, and wherein said inside panel is disposed at one hundred and twenty degrees from said tangential line, and wherein said outside panel is disposed at ninety degrees from said tangential line.

* * * * *